(12) United States Patent
Hejlsberg et al.

(10) Patent No.: US 10,534,692 B2
(45) Date of Patent: Jan. 14, 2020

(54) TAGGED TRACING, LOGGING AND PERFORMANCE MEASUREMENTS

(71) Applicant: Microsoft Technology Licensing, LLC, Redmond, WA (US)

(72) Inventors: Thomas Hejlsberg, Hørsholm (DK); Boaz Lev, Charlottenlund (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 15/274,881

(22) Filed: Sep. 23, 2016

(65) Prior Publication Data

US 2017/0286262 A1 Oct. 5, 2017

Related U.S. Application Data

(60) Provisional application No. 62/316,078, filed on Mar. 31, 2016.

(51) Int. Cl.
| | |
|---|---|
| *G06F 11/36* | (2006.01) |
| *G06F 11/34* | (2006.01) |
| *G06F 11/30* | (2006.01) |
| *G06F 8/51* | (2018.01) |
| *G06F 8/75* | (2018.01) |

(52) U.S. Cl.
CPC ............ *G06F 11/3636* (2013.01); *G06F 8/51* (2013.01); *G06F 8/75* (2013.01); *G06F 11/302* (2013.01); *G06F 11/3409* (2013.01); *G06F 11/3466* (2013.01); *G06F 11/3612* (2013.01); *G06F 11/3644* (2013.01); *G06F 2201/88* (2013.01)

(58) Field of Classification Search
CPC .............. G06F 11/302; G06F 11/3409; G06F 11/3636; G06F 11/3434
USPC ....................................................... 717/128
See application file for complete search history.

(56) References Cited

U.S. PATENT DOCUMENTS

| | | | |
|---|---|---|---|
| 5,581,696 A * | 12/1996 | Kolawa | G06F 11/3624 714/38.1 |
| 6,311,327 B1 | 10/2001 | O'Brien et al. | |
| 7,587,709 B2 | 9/2009 | Chilimbi et al. | |
| 7,698,692 B1 | 4/2010 | Garud et al. | |
| 7,735,073 B1 | 6/2010 | Kosche et al. | |
| 7,774,760 B2 | 8/2010 | Mishra et al. | |
| 8,141,056 B2 * | 3/2012 | Prasadarao | G06F 11/3644 717/130 |
| 8,245,200 B2 | 8/2012 | Baierl et al. | |
| 8,245,203 B2 | 8/2012 | Becker | |
| 8,719,798 B2 | 5/2014 | Unger | |
| 8,745,596 B2 | 6/2014 | Maybee | |

(Continued)

FOREIGN PATENT DOCUMENTS

| | | |
|---|---|---|
| WO | 2000043886 A1 | 7/2000 |
| WO | 2002052411 A1 | 7/2002 |

OTHER PUBLICATIONS

International Search Report and the Written Opinion issued in PCT Application No. PCT/US20171024401, dated Oct. 9, 2017.

(Continued)

*Primary Examiner* — John Q Chavis
(74) *Attorney, Agent, or Firm* — Workman Nydegger

(57) ABSTRACT

Instrumenting code. One embodiment includes identifying a line of source code having an incomplete instrumentation. A unique identifier tag is obtained from an identifier source. The unique identifier tag is inserted into the instrumentation.

15 Claims, 10 Drawing Sheets

(56) References Cited

U.S. PATENT DOCUMENTS

| | | | |
|---|---|---|---|
| 9,098,290 | B2 | 8/2015 | Chithambaram et al. |
| 9,449,042 | B1* | 9/2016 | Evans .................. G06F 8/36 |
| 2005/0138111 | A1 | 6/2005 | Aton et al. |
| 2006/0059146 | A1 | 3/2006 | McAllister et al. |
| 2006/0200806 | A1 | 9/2006 | Tasinga |
| 2008/0109792 | A1* | 5/2008 | O'Dowd ............. G06F 11/3636 717/128 |
| 2009/0187890 | A1 | 7/2009 | Branda et al. |
| 2009/0254889 | A1* | 10/2009 | Prasadarao ......... G06F 11/3636 717/130 |
| 2013/0067439 | A1* | 3/2013 | Noureddine ........ G06F 11/3624 717/130 |
| 2013/0132933 | A1 | 5/2013 | Rajaram et al. |
| 2014/0019945 | A1* | 1/2014 | Young ................ G06F 11/3612 717/130 |
| 2014/0354448 | A1* | 12/2014 | Armitage ................ H04Q 9/00 340/870.16 |
| 2015/0370552 | A1 | 12/2015 | Hejlsberg et al. |
| 2016/0041894 | A1* | 2/2016 | Reid, III ............. G06F 11/3636 714/45 |

OTHER PUBLICATIONS

"Debugging Script with the Developer Tools", Published on: Apr. 19, 2012 Available at: https://msdn.microsoft.com/en-us/library/dd565625(v=vs.85).aspx.

* cited by examiner

TAGGED TRACING, LOGGING AND PERFORMANCE MEASUREMENTS

CROSS-REFERENCE TO RELATED APPLICATIONS

This application claims the benefit of and priority to U.S. Provisional Patent Application Ser. No. 62/316,078 filed on Mar. 31, 2016 and entitled "Tagged Tracing, Logging and Performance Measurements," which application is expressly incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Background and Relevant Art

Computers and computing systems have affected nearly every aspect of modern living. Computers are generally involved in work, recreation, healthcare, transportation, entertainment, household management, etc.

As computing systems are being used by more and more people, it becomes important to measure how systems perform in real world scenarios such that an accurate depiction of usage of the system can be used to make decisions about potential improvements. Today, such performance measurements are made artificially in performance labs, where a system under test runs through scenarios which may not accurately depict how the system is being used by real users. Alternatively, these performance measurements can be made using operating system (OS) performance counters, but that uses important and scarce resources to call into the operating system to increment these counters.

Additionally, as a system is being used more and more, and in environments where live diagnosis is difficult or impossible, it becomes important to capture diagnostics information which will allow for fast and effective resolution of issues as they are identified in the running system. However, currently systems emit textual information into a log which must then be reviewed and categorized by a developer and/or system administrator.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes computer implemented instrumentation of code with tags. This includes identifying a line of source code that that includes an incomplete instrumentation that indicates where a unique identifier tag should be inserted into the instrumentation. This further includes obtaining a unique identifier tag from an identifier source. The unique identifier tag is inserted into the instrumentation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
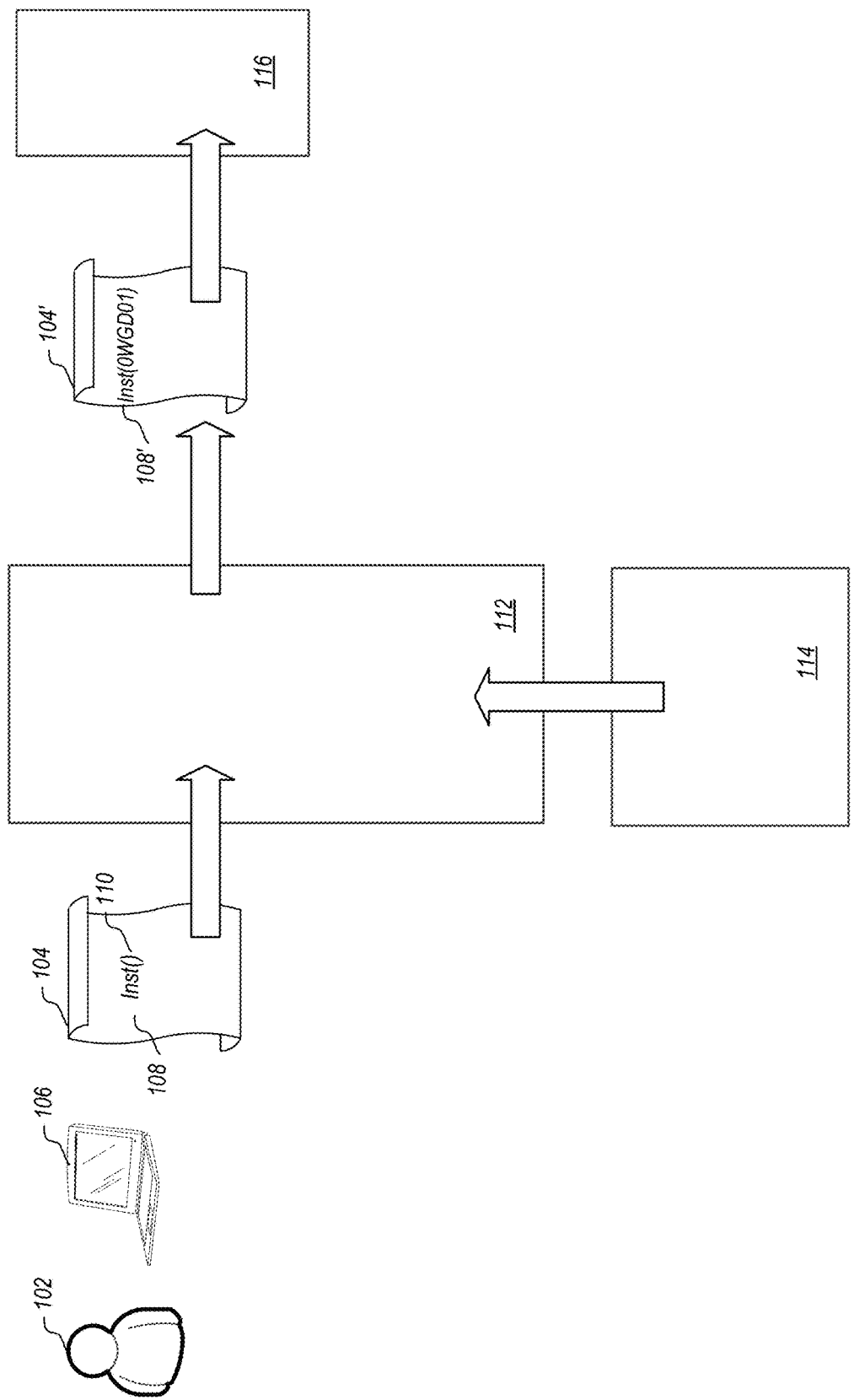
FIG. 1 illustrates an instrumentation tool configured to instrument tagged code.

It can be important to measure how a system performs in real world scenarios such that an accurate depiction of usage of the system can be used to make decisions about potential improvements.

Some embodiments described herein can implement a low impact (on the operating system and runtime) solution where measurements are scoped and thus only increment values locally (which is less resource intensive) and roll up when the scope is complete thus saving important computing cycles (thus creating a more energy efficient computing system than previous systems) while still being able to get accurate measurements.

Additionally, as a system is being used more and more, and in environments where live diagnosis is difficult or impossible, it becomes important to capture diagnostics information which will allow for fast and effective resolution of issues as they are identified in the running system. Today, this happens by emitting messages with textual information into a suitable log which can be consumed later. Often, there is no specific structure or format to these messages, and as a further drawback, these messages do not directly identify where in the source code an issue arose. This means that the logged messages will have to have textual references to the location in the source code which caused the log statement to be issued, or stack traces have to be obtained to identify the source of the emission to the log. The former is unstructured and error prone, and the latter is extremely expensive in terms of performance.

Embodiments illustrated herein use unique identifiers tags (referred to herein generally as 'tags') which are included in instrumentation and associated with emissions to a log such that these unique identifier tags are carried to the log along with the message of the emission. These unique identifier tags are guaranteed to be unique across the entire source code base. This ensures that a unique identifier tag can be used to identify a location, i.e., a specific line, in source code with little to almost no runtime impact. Additionally, using unique identifier tags for source code location ensures that they are easily discoverable and easy to post process.

Embodiments can additionally or alternatively implement categories and severity levels associated with each instrumentation such that filtering in a vast amount of data from a running system becomes easy and efficient.

Consider an example where an incident has happened in a running environment which requires fast diagnosis to maintain high uptime. Embodiments may include functionality, by including instrumentation having a unique identifier tag, to cause an incident to be recorded in a suitable log file, along with the unique identifier tag that could direct troubleshooting with high accuracy to the line or few lines of source code causing the incident. By inserting a unique identifier tag in the source code, along with an instrumentation, where the unique identifier tag is guaranteed to be unique across all the source code making up the system, and which will be transferred to a suitable log, embodiments can optimize troubleshooting by now having the unique identifier tag present in both the log and in the source code. In this way, developers can quickly identify the exact line of source code or few lines of code causing an incident. In particular, the unique identifier tag will be emitted to a log, along with information related to the line of code. An administrator can then identify the unique identifier tag in both the source code and the log to identify a line of source code corresponding to an entry in the log.

This, along with previous instrumentations along the path of execution which lead to the incident, allows the support personnel or developers to reverse engineering the incident and thus aiding the resolution of the incident. Additionally or alternatively, using the category and severity which is associated with each instrumentation and carried into the log, filtering vast amounts of data can be done fast and efficiently.

Again using the example of a running system, consider a case where customers are complaining about poor performance as they use the system. Using a traditional approach for measuring performance of a system has a several problems in that:

(1) The measurements typically made in the test labs may not reflect what real world users are doing as measurement are typically made using scripts written based on assumptions of system usage.

(2) The measurements typically made in the test labs are not granular enough such that they can measure the actual performance experienced by the individual user, but rather measure how the system behaves as a whole.

(3) The measurements typically are either extremely granular, or the system impact of obtaining the measurements is high.

Some embodiments illustrated herein allow for non-intrusive measuring of performance measurements of scoped sections of the code which can be rolled up across levels in a system. For instance, for each deployment, there may be only one service instance servicing a number of, for example, tenants. Each of these tenants in turn may service zero or more users. Embodiments may include functionality to record performance measurements at any level allowing these measurements to "bubble" up to the levels above it. This means that, for instance, if measuring a number of times a user has caused a Structured Query Language (SQL) statement to be executed, the measurement of the number of times a SQL statement has been executed for a given user will roll and be added to the number of times the tenant, in servicing all the users belonging to the particular tenant, has executed SQL statements. Note, here the number of times SQL statements are executed just serves as an example of what can be measured. For instance, number of exceptions, wall-clock execution time, number of language statements, etc., can be measured in this way. Embodiments can be implemented to ensure that the recording of this performance data is fast at the local level, and only transferred up to the level above when a scope completes. This means that there is little to no impact associated with measuring the performance of the running system.

Embodiments herein allow code to be instrumented by identifying specific lines of code with incomplete instrumentation in the code. The instrumentation can indicate that a unique identifier tag should be included in the instrumentation. In some embodiments, this is indicated by virtue of the instrumentation being incomplete. For example, the instrumentation may have an empty tag field. Embodiments can then automatically obtain unique identifier tags from an identifier source. The unique identifier tags can then be inserted into the instrumentation such that unique identifier tags can be specifically correlated to specific lines in code.

Further, embodiments can implement tracing within "scopes", as defined further herein, thereby incrementing a local set of counters and having them aggregate themselves to a parent.

An example is shown in FIG. 1. FIG. 1 illustrates a developer 102 generating source code 104 at a computing system 106. The developer 102 can identify in the code certain lines of the code that the developer 102 wishes to have instrumented. For example, in some embodiments, the developer 102 can place an instrumentation 108 in the code 104. The instrumentation 108 may contain an empty identifier field 110 indicating that the instrumentation 108 needs to be tagged. For example, consider the following code where a developer has added instrumentation to source code. The instrumentation includes an application programming interface (API) call. See e.g., the following instrumentation, which includes an API call.

this.session.Diagnostics.SendTraceTag(" ", Category.Runtime, Verbosity.Normal, "Hello World!)

In this example, the API call includes an empty identifier field. This empty identifier field indicates to a tool 112, when it encounters the API call that a unique identifier tag should be obtained and added to the instrumentation 108 as indicated by the double quotation marks.

The code 104 is provided to the tool 112. The tool 112 can scan the code 104 to identify that a unique identifier tag needs to be included in the instrumentation. In the present example, with respect to the code illustrated above, the tool 112 scans the source code 104 to detect the "SendTraceTag" API. Once this is detected, the tool 112 then identifies whether the first parameter (or other appropriate parameter in other embodiments) is incomplete. In the illustrated example, the tool 112 attempts to identify if the first parameter is incomplete (e.g., empty). The tool 112 obtains an available unique identifier tag from the identifier source 114 and inserts the unique identifier tag into the code 104 at the instrumentation 108. This allows the tool 112 to create modified source code 104'. The modified source code 104' includes a modified instrumentation 108' which includes the unique identifier tag obtained from the identifier source 114. For example, using the code illustrated above, the modified code 104' may include the following line of Instrumenting code:
this.session.Diagnostics.SentTraceTag("0WDG01", Category.Runtime,
Verbosity.Normal, "Hello World")
where the unique identifier tag is 0WDG01.

The modified source code 104' is then submitted to a central build system 116 where it can be compiled, including the instrumentation which will cause emissions to a log when executed, where the emissions include the unique identifier tag be emitted to the log, and distributed as part of an application or production system.

Thus, embodiments may associate each instrumentation in a running system with a unique identifier tag, which allows the association of a single instrumentation with a single line in the source code making up the system.

Figure 2:
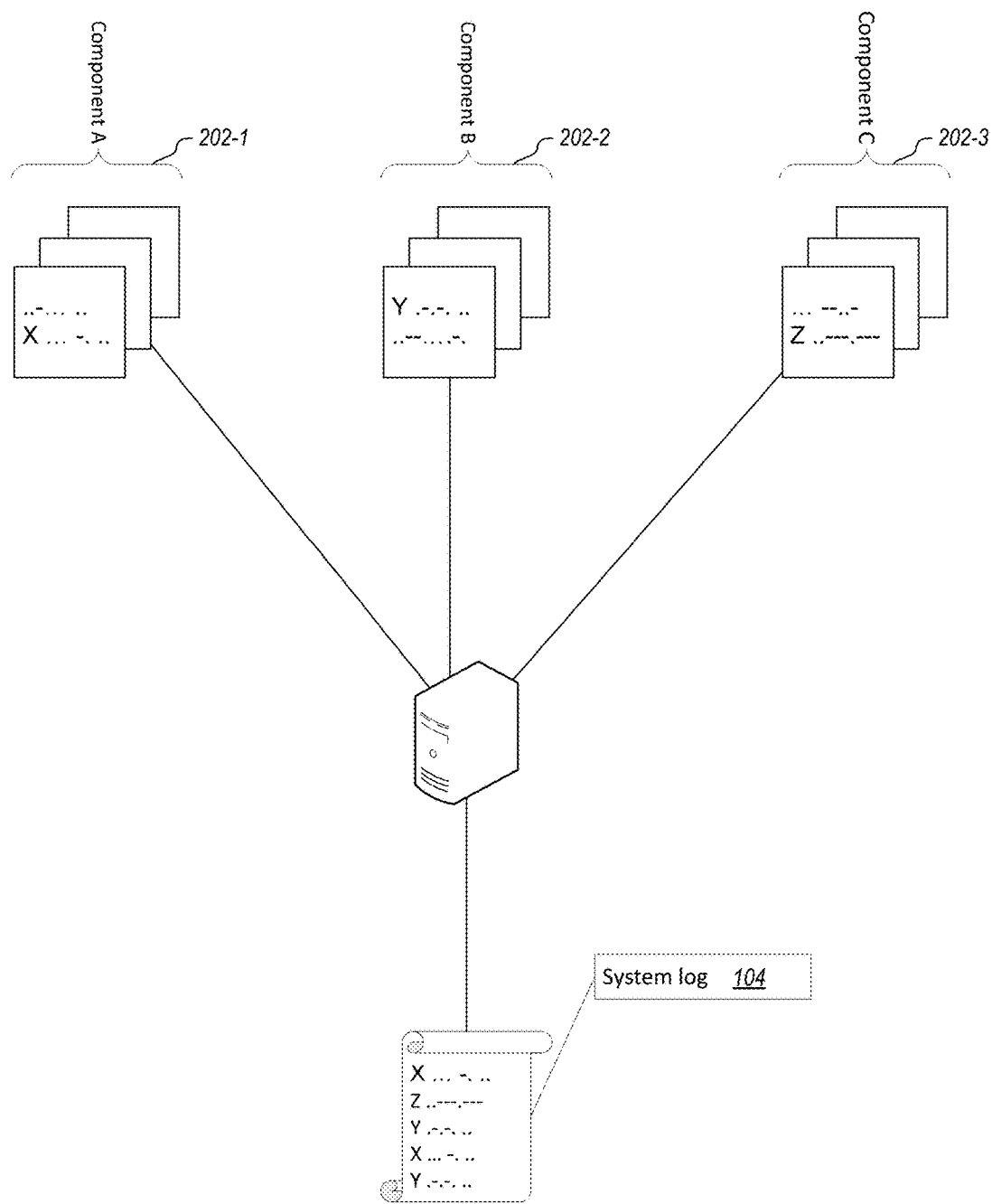
FIG. 2 illustrates a production system running instrumented code.

Referring now to FIG. 2, an example of a production system 200 is illustrated. In the example illustrated in FIG. 2, a running system 200 is comprised of three components 202-1, 202-2, and 202-3. Each of these components is made up of some source code which gets compiled to form the individual components. Each of these pieces of source code contain instrumentations (in FIG. 2, these are X, Y and Z). As the system 200 is running in production, log entries resulting from these instrumentations are added to the system log with the message they carry specified by the instrumentation (or in some embodiments, actual associated code associated with the instrumentations). This causes information, including unique identifier tags, to be stored in the system log 204. This information can be used to find the exact line in the source code where instrumentation having a particular unique identifier tag is placed. With this information it is possible to reconstruct the path of execution. In particular, the system log 204 will contain sufficient information to match a particular log entry to the exact line of source code or lines of code corresponding to the log entry. In particular, lines of code will have a unique identifier tag associated with them correlated with a unique identifier tag in the system log 204. Typically, the unique identifier tag in the code is the same unique identifier tag that appears in the system log 204. However, in other embodiments other correlations may be used especially when such correlations can be quickly and simply generated.

Additional details are now illustrated with reference to FIG. 3. In the example in FIG. 3, a deployed system is comprised of a service 300, which serves n tenants numbered Tenant 302-1 through Tenant 302-n. Each of these tenants has a number of users associated as belonging to that tenant (users for Tenant 302-2 through Tenant 302-n have been omitted for clarity). From the illustration, Tenant 302-1 has currently m users active (User 304-1, User 304-2 through User 304-m). It can also be seen that the number of measurements over the lifetime of the tenant 302-1 instance includes 731 SQL statements that have been executed and 37 exceptions were raised. These numbers are an aggregation of the activity by users 304-1 through 304-m and any exceptions or SQL statements executed by the tenant 302-1 on its own behalf. Further, it can be seen that User 304-1 has executed 343 SQL statements and caused 9 exceptions to be raised.

Figure 3:
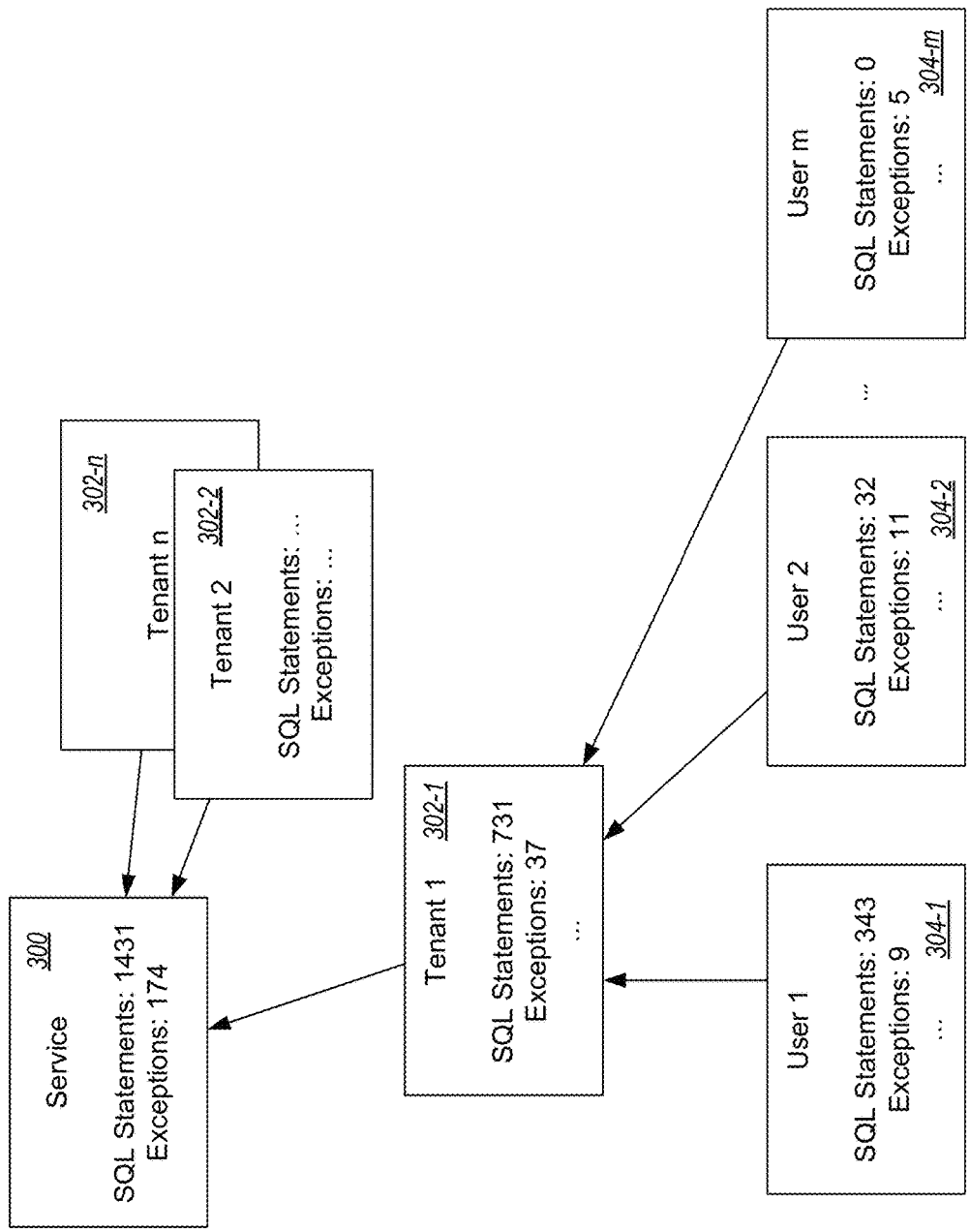
FIG. 3 illustrates a deployed cloud system and tenant users.

The statistics illustrated in FIG. 3, can be obtained using a concept of scopes. In particular, embodiments can capture live performance data while the system is running in a non-intrusive way such that performance of the system is not affected while still being able to measure and roll up measurements. For example, consider the following code:

```
using (tenant.Diagnostics.CreateTraceScope("000000M",
    "Dispatch", MonitorType.ExceptionCount))
{
    tenant.Diagnostics.SendTraceTag("000002F",
    Category.Runtime, Verbosity.Normal,
    string.Format(CultureInfo.InvariantCulture, "Dispatching SOAP
    call service ID {0}, object type {1}", service.Id,
    service.NavObjectType));
        using (IXmlRequestHandler handler =
    MetadataManager.FindSoapAdapter(relivantURLPart.Service,
    tenant))
        {
            handler.Dispatch(inputDoc.DocumentElement, @out);
        }
}
```

In the example code above, a scope is created. The unique identifier tag or of the scope is "000000M", which will be sent to the logs along with the descriptive string "Dispatch" when this scope is executed. Further, in this scope, there is an interest in counting the number of exceptions. Inside the given scope, a trace statement is visible, again with a tag. This statement also has a category and verbosity level (severity).

Thus, embodiments can implement freeform categorizing by one or more other parameters. For example, the category Category.Runtime is illustrated in the code above. This is just one example, and other embodiments could name this to be associated with any other name.

Thus, embodiments can associate a category to each instrumentation, for instance using subsystem as a category, such that filtering in the data produced becomes easier. In particular, a log could be filtered by runtimes or other selected categories.

Embodiments may include a verbosity parameter as illustrated above. The verbosity is a level of severity indicator. For example, as illustrated above, the code includes a parameter Verbosity.Normal indicating that the severity is a medium level severity. Embodiments could include other verbosity levels, such as Verbosity.critical indicating a higher level severity or Verbosity.low indicating a low level severity. In the case of low severity, what is being indicated is that the entry logged with "low" is less important than higher level severity and not something that would be seen under normal circumstances. This severity level is used when needing to diagnose an issue and there may be a need to turn up magnification to identify what is happening in the running system. Of course the specific implementations are user selectable.

Some embodiments may associate a severity level to each instrumentation such that, for instance, informational messages can be filtered out when looking for, for instance, a system crash. Under normal circumstances these can be filtered so that the developer/administrator will not be overwhelmed by low severity messages. These may only be important when, for instance, looking for causes to a system crash in which case there may be a desire to have as much data as can be obtained.

Some embodiments may implement counters as illustrated by the results in FIG. 3. Previous systems typically used a test environment with scripted tests to simulate user interaction. Alternatively or additionally, runtime counters could track runtime operations. However, this may reduce performance.

Embodiments illustrated here can use a separate scope of code. In particular, embodiments can use a chunk of code for segment tracking. Embodiments segment code into a "scope". Such a scope may be a scope defined where the scope can be tied to a function, a user, a tenant, a service, or other selected scope.

Illustratively, in some embodiments, at the beginning of a scope, embodiments start an incrementing counter (indicating the start of scope), and emit log lines with unique tags. At the end of the scope, embodiments stop the incrementing counter, indicating the end of the scope, and emit log lines with unique tags.

Specifically, an instrumented scope will execute the tagged lines. Some instrumented lines will increment counters (e.g., number of SQL calls, number of exceptions in the scope, etc. After the main function of the scope is completed, a portion of the scope adds counts to a total.

Embodiments may implement a tree structure of counters, to roll up totals at multiple levels. Thus, as illustrated in FIG. 3, counters from users can be rolled up into totals for a tenant, and counters from tenants can be rolled up into totals for a service.

While counters are illustrated here, it should be appreciated that embodiments could additionally or alternatively identify other metrics, such as execution time or other metrics. Thus, rollup totals could be counters, execution time (of each scope), etc. Each scope has its counts emitted to the log (e.g., log 204) as each scope exits.

Embodiments may be particularly useful in cloud environment implementations where it may be difficult to add a debugger. This can be overcome by using unique tags in a log stored in the cloud environment.

A developer can use logs to analyze the tags to determine performance of various scopes of code and code associated with individual tags. An administrator/developer could use log analysis to change parameters, or other performance improvements. In some embodiments, these functions could be performed by machine learning systems that could identify when settings resulted in changes to system performance. Embodiments could particularly identify what changes to a system resulted in what decreases or increases of certain code being run on the system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
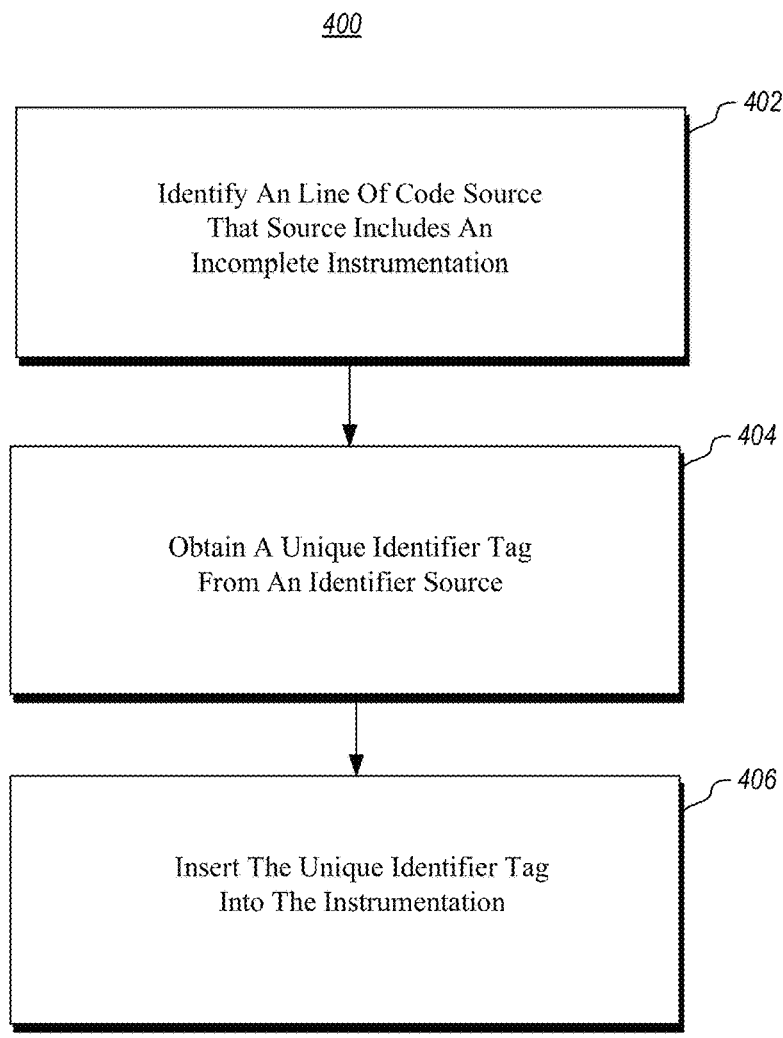
FIG. 4 illustrates a method of automatically instrumenting code

Referring now to FIG. 4, a method 400 is illustrated. The method may be practiced in a computing environment. The method 400 includes acts for automatically instrumenting code. The method 400 includes identifying a line of source code that includes an incomplete instrumentation (act 402). For example, as illustrated in FIG. 1, the tool 112 may identify in code 104 that the instrumentation 108 has an empty identifier field 110. By identifying that the identifier field 110 is empty, the tool can determine a need for a unique identifier tag for the code 104. In some embodiments, identifying a line of source code that includes an incomplete instrumentation may include scanning source code to detect a particular API and then as a result identifying if a particular parameter in the API is incomplete. In this example, the API is included as part of the instrumentation.

The method 400 further includes obtaining a unique identifier tag for the instrumentation from an identifier source (act 404). For example, as illustrated in FIG. 1, the tool 112 can obtain a unique identifier tag from the identifier source 114.

The method 400 further includes inserting the unique identifier tag into the instrumentation (act 406). For example, as illustrated in FIG. 1, the tool 112 can insert the unique identifier tag into the code 104 at a particular line that includes the instrumentation to create modified code 104', which can then be provided to a central build system 116.

As illustrated above, the method 400 may be practiced where the unique identifier tag is a base 36 number.

The method 400 may be practiced where the identifier source is a file of one or more identifiers. For example, the identifier source 114 may simply be a document with the last used identifier to allow the system to compute, increment, or otherwise obtain a next identifier.

The method 400 may be practiced where the identifier source is a state machine. For example, in some embodiments the identifier source 114 may be a a W counting state machine. When the tool 112 attempts to obtain an identifier from the identifier source 114, the state machine will increment to create a new unique identifier tag that can be provided to the tool 112.

The method 400 may be practiced where the identifier source is a database, etc. For example, the identifier source 114 may simply be a database containing the last used identifier to allow the system to compute, increment, or otherwise obtain a next identifier.

The method 400 may further include creating a log entry in a log where the log entry comprises the unique identifier tag correlated to one or more elements for the line of code. For example, as illustrated in FIG. 2, the system log 204 includes both unique identifier tags such as those provided from the identifier source 114 correlated with artifacts from the code 104. In some embodiments, the correlated element is commented code. For example, the code 104 may be commented lines of code. A line associated with the unique identifier and having a comment can be logged such that the unique identifier is associated with the comment in the system log 204. In an alternative embodiment, the correlated element is a line of source code itself. Thus, as illustrated, the code 104 may have lines of code associated with unique identifiers. An actual line of source code may be correlated in the system log 204 by being included in the system log 204 along with a corresponding unique identifier tag where the unique identifier tag corresponds to the line of code in the code 104.

Figure 5:
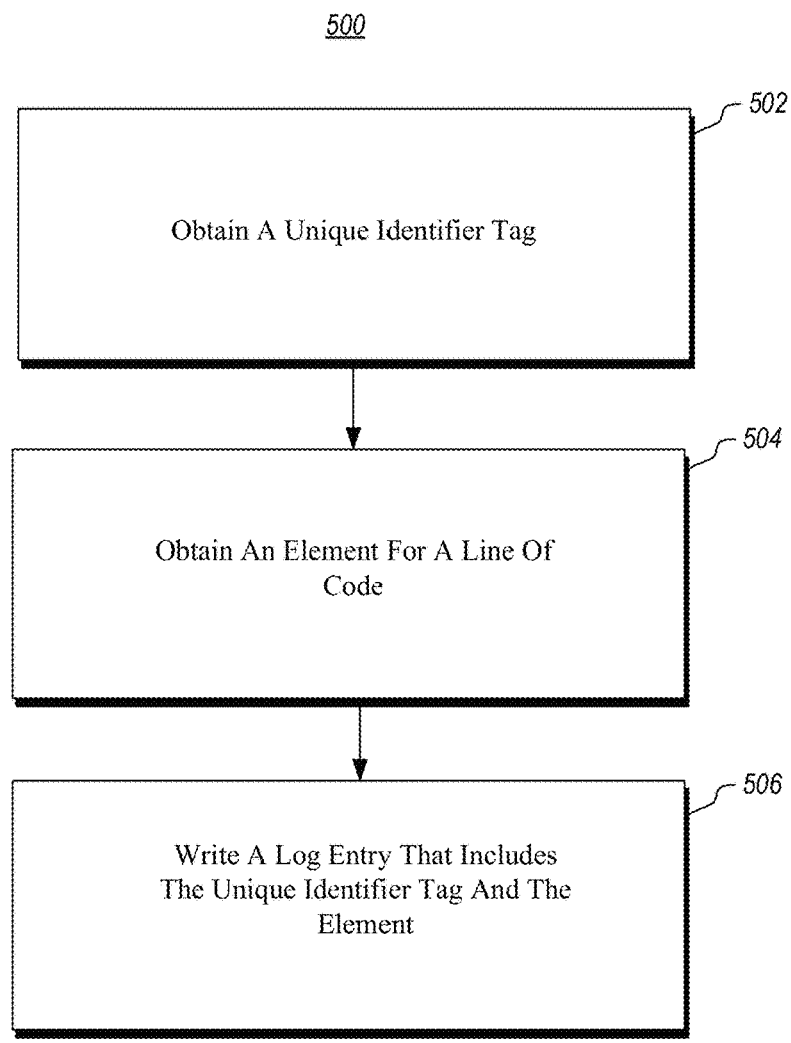
FIG. 5 illustrates a method of creating a log entry.

Referring to FIG. 5, various acts are illustrated for creating a log entry. In particular, FIG. 5 illustrates a method 500 including an act of obtaining a unique identifier tag (act 502). In particular, the unique identifier tag can be obtained from an instrumentation at a line of code having the unique identifier tag. FIG. 5 further illustrates obtaining an element for the line of code (act 504). For example, a comment for the line of code, the line of code itself, a severity level included in the instrumentation at the line of code, a category included in the instrumentation at the line of code, etc., could be obtained. The method 500 further includes writing a log entry that includes the unique identifier tag and the element (act 506).

Figure 6:
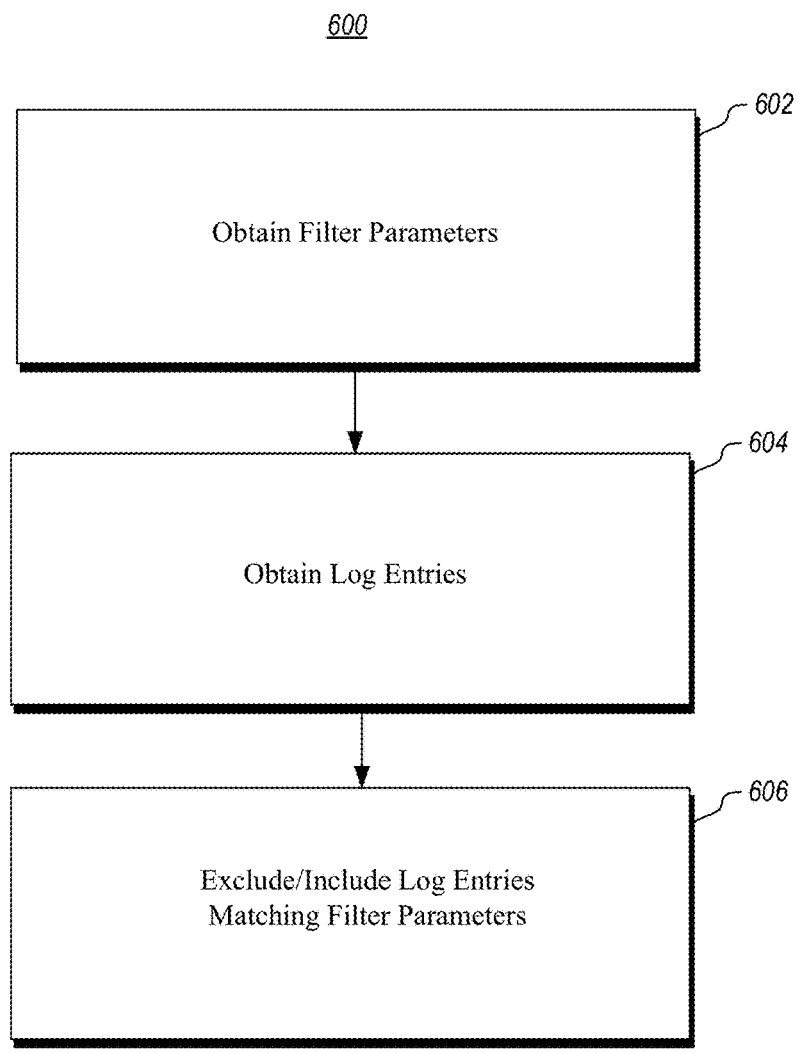
FIG. 6 illustrates a method of obtaining filter parameters.

The method 400 may further include filtering log entries. For example, filtering may be based on at least one of severity level or categories. FIG. 6 illustrates a method 600 of filtering log entries. In particular, FIG. 6 illustrates obtaining filter parameters (act 602). For example, user input may be received specifying particular filter terms. The method 600 further includes obtaining log entries (act 604). For example, embodiments may access the log to obtain one or more entries from the log, or in some cases the entire log. The method 600 further includes excluding/including log entries matching filter parameters (act 606). For example, embodiments may compare the obtained filter parameters with parameters specified in log entries and either include any log entries matching the filter parameters in a dataset or exclude any log entries matching the filter parameters in a dataset. The dataset could then be provided to the user.

The method 400 may further include, within a scope, identifying counters that are incremented as a result of executing lines of code. When lines of code are executed, a counter may be incremented indicating that the line of code was executed. In some embodiments, the types of lines of code may be aggregated such that a count can be determined by a counter for the number of times a particular type of line of code was executed.

Figure 7:
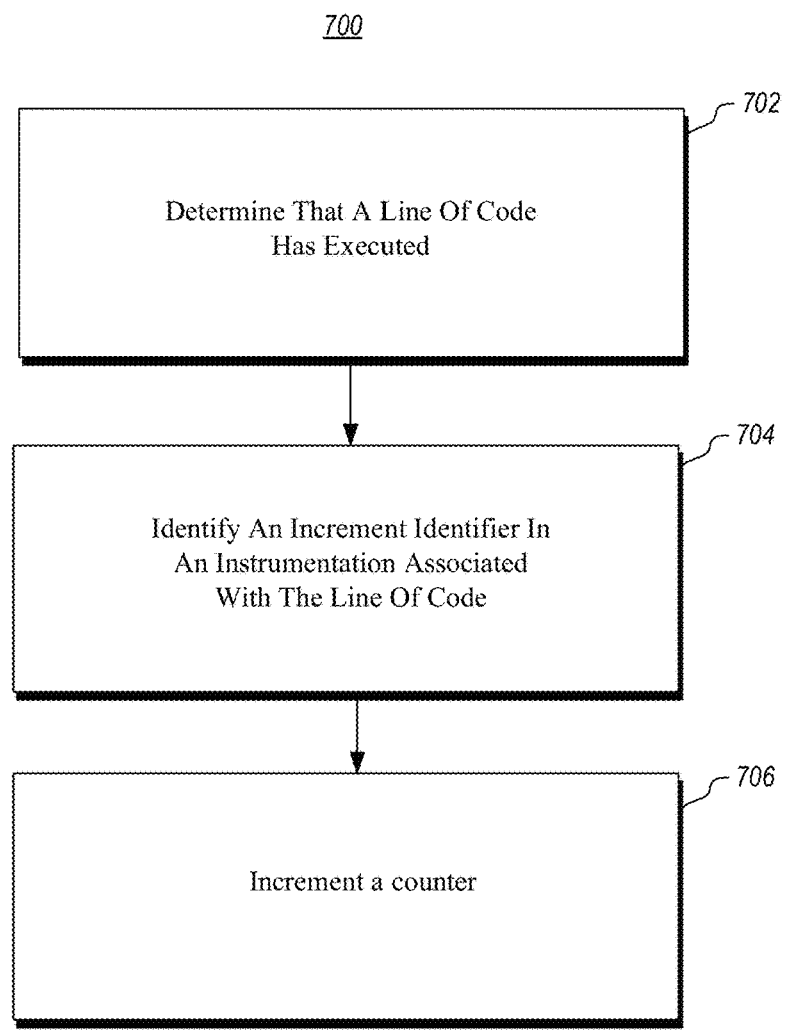
FIG. 7 illustrates a method of incrementing counters.

Referring now to FIG. 7, a method 700 of incriminating counters for a particular scope is illustrated. FIG. 7 illustrates determining that a line of code has executed (act 702). For example, the line of code that has been instrumented with an instrumentation may be executed. Embodiments may identify an increment identifier in an instrumentation associated with the line of code (act 704). For example, an instrumentation may include an indication that any time the line of code is executed a counter should be incremented. Embodiments include incrementing a counter (act 706). This is performed as a result of determining that a line of code has executed.

Figure 8:
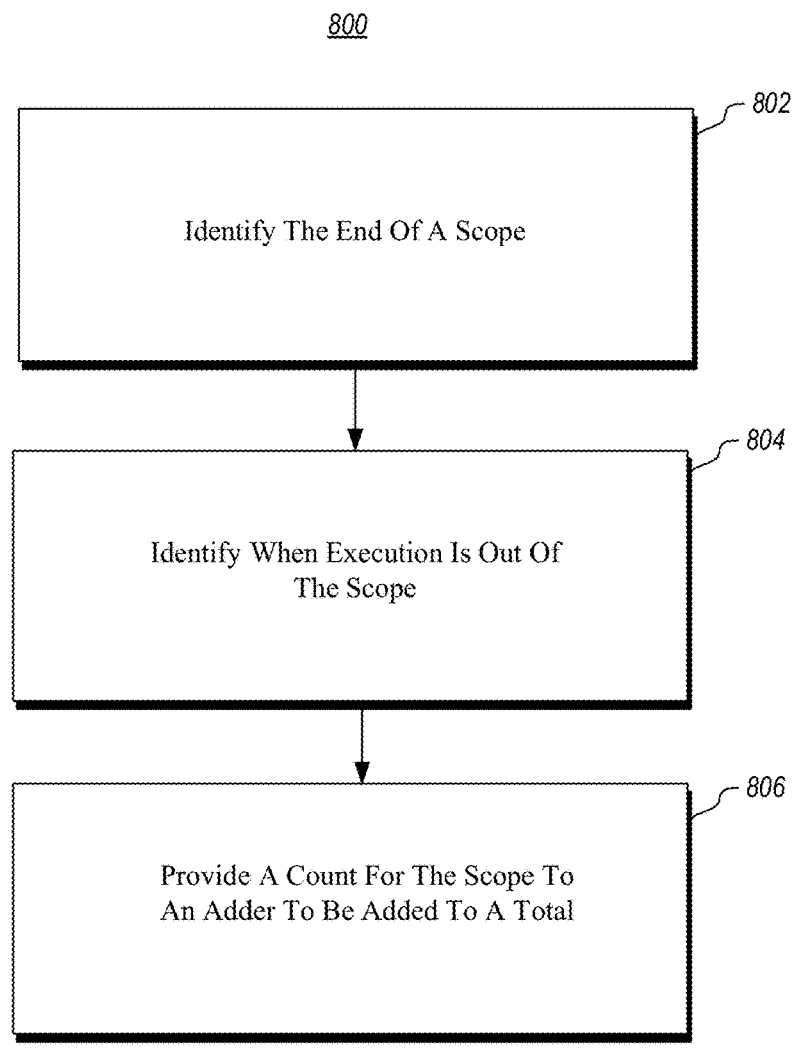
FIG. 8 illustrates a method of adding a count to a counter.

The method may further include identifying that a main function of a scope is completed, and as a result, adding a count from the counter to a total. For example, FIG. 8 illustrates a method 800 that may be used to accomplish this functionality. FIG. 8 illustrates that embodiments identify the end of a scope (act 802). This may be done by identifying instrumentation that identifies a line at the end of a scope. The method 800 further includes identifying when execution is out of scope (act 804). For example, this may include identifying when a scope has completed. As a result, the method 800 may further include providing a count for the scope to an adder for the count to be added to a total (act 806).

Figure 9:
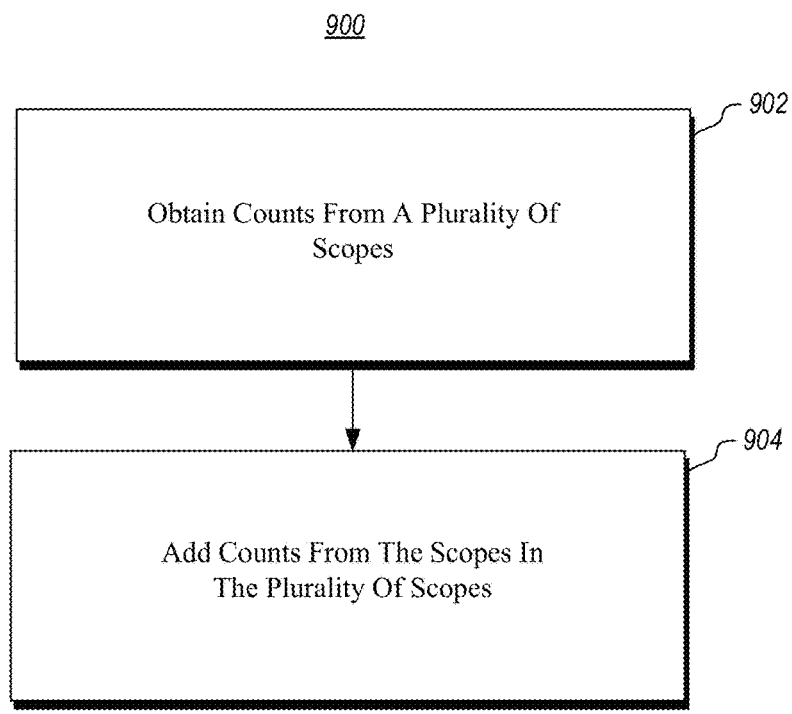
FIG. 9 illustrates a method of rolling-up totals.

The method 400 may further include rolling-up totals from multi levels of a service structure. For example, a method 900 is illustrated in FIG. 9. FIG. 9 illustrates that counts are obtained from a plurality of scopes (act 902). The counts from the different scopes are then added (act 904) to roll-up the totals.

Figure 10:
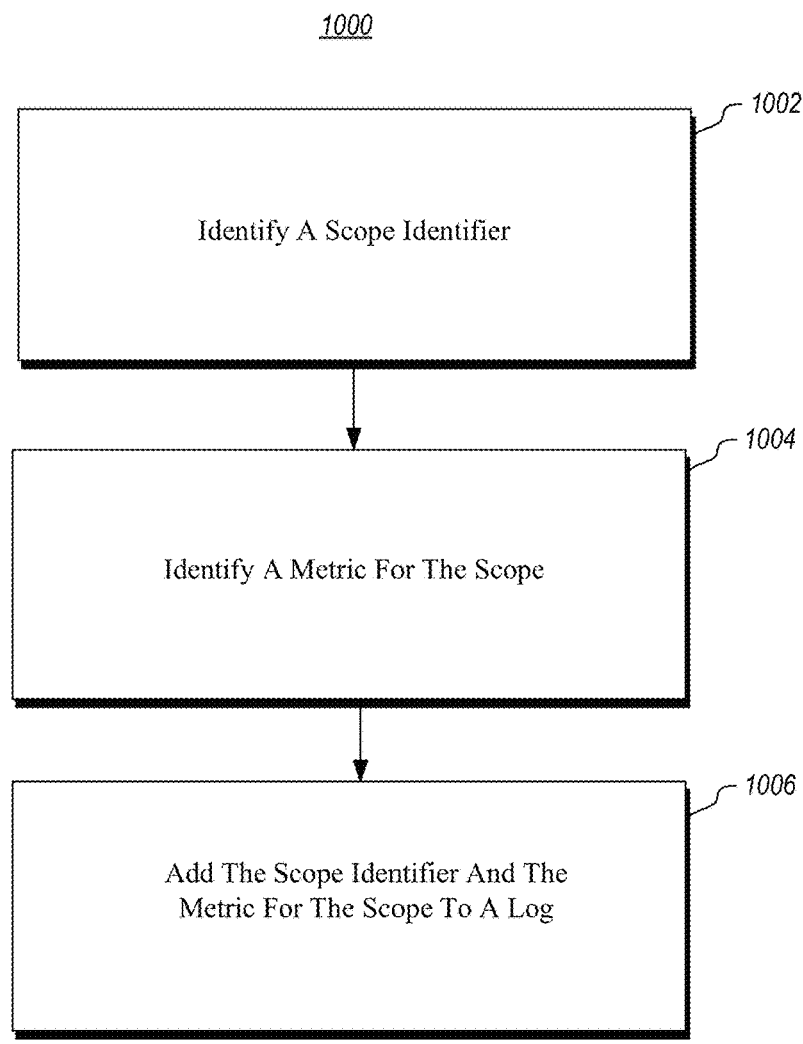
FIG. 10 illustrates a method of creating a log entry.

The method 400 may further include creating a log entry in a log wherein the log entry comprises a metric for a scope of code. Such a metric may be a number of times a line of code is executed, execution time, or other metrics. For example, as illustrated in the method 1000 in FIG. 10, embodiments may identify a scope identifier (act 1002), such as a unique identifier tag associated with a scope. The method 1000 may further include identifying a metric for the scope (act 1004) such as a number of executions or a length of time. The method may further include adding the identifier and the metric to a log (act 1006), such as the system log.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes Random Access Memory (RAM), Read Only Memory (ROM), Electronically Erasable Programmable Read Only Memory (EEPROM), Compact Disk (CD)-ROM or other optical disk storage (such as CDs, Digital Versatile Disks (DVDs), etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a Network Interface Card (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network Personal Computers (PCs), minicomputers, mainframe computers, mobile telephones, Personal Digital Assistants (PDAs), pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon instructions that are executable by the one or more processors to configure the computer system to automatically instrument source code, including instructions that are executable to configure the computer system to perform at least the following:
   receive a source code document;
   identify a line of source code, from within the source code document, that includes an incomplete instrumentation, wherein the incomplete instrumentation comprises a modifiable portion configured to receive a unique identifier tag;
   create the unique identifier tag for the incomplete instrumentation;
   insert the unique identifier tag into the modifiable portion of the instrumentation, such that the source code document is modified;
   associate, with the instrumentation, at least one of (i) a specification of a severity level for the instrumentation, which is associated with an importance of the instrumentation, or (ii) a specification of a category for the instrumentation; and
   correlate the unique identifier tag to the line of source code,
   the instrumentation being structured to create a log entry in a log at runtime, wherein the log entry comprises the unique identifier tag correlated to one or more elements for the line of source code, the correlated one or more elements comprising at least one of (i) the severity level for the instrumentation, or (ii) the category for the instrumentation.

2. The computing system of claim 1, wherein the unique identifier tag is a base 36 number.

3. The computing system of claim 1 wherein, the unique identifier tag is created based on an identifier source, and wherein the identifier source is at least one of a file of one or more identifiers, a state machine, or a database.

4. The computing system of claim 1, wherein the correlated one or more elements also comprise at least one of (i) a comment in the code or (ii) the line of source code.

5. The computing system of claim 1, wherein one or more computer-readable media further have stored thereon instructions that are executable by the one or more processors to configure the computer system to filter log entries based on at least one of the severity level or the category.

6. The computing system of claim 1, wherein one or more computer-readable media further have stored thereon instructions that are executable by the one or more processors to configure the computer system to, within a scope, increment a counter as a result of executing a line of source code associated with an instrumentation.

7. The computing system of claim 6, wherein one or more computer-readable media further have stored thereon instructions that are executable by the one or more processors to configure the computer system to identify that a main function of a scope is completed, and as a result, add a count from the counter to a total.

8. The computing system of claim 7, wherein one or more computer-readable media further have stored thereon instructions that are executable by the one or more processors to configure the computer system to roll-up totals from multi levels of a service structure.

9. A computer implemented method of instrumenting source code, the method comprising:
   receiving a source code document;
   identifying a line of source code, from within the source code document, that includes an incomplete instrumentation, wherein the incomplete instrumentation comprises a modifiable portion configured to receive a unique identifier tag;
   creating the unique identifier tag for the incomplete instrumentation;
   inserting the unique identifier tag into the modifiable portion of the instrumentation, such that the source code document is modified;
   associating, with the instrumentation, at least one of (i) a specification of a severity level for the instrumentation, which is associated with an importance of the instrumentation, or (ii) a specification of a category for the instrumentation; and
   correlating the unique identifier tag to the line of source code,
   the instrumentation being structured to create a log entry in a log at runtime, wherein the log entry comprises the unique identifier tag correlated to one or more elements for the line of source code, the correlated one or more elements comprising at least one of (i) the severity level for the instrumentation, or (ii) the category for the instrumentation.

10. The method of claim 9, wherein the unique identifier tag is a base 36 number.

11. The method of claim 9, wherein the unique identifier tag is created based on an identifier on an identifier source, and wherein the identifier source is at least one of a file of one or more identifiers, a state machine, or a database.

12. The method of claim 9, wherein the correlated one or more elements also comprise at least one of (i) a comment in code or (ii) the line of source code.

13. The method of claim 9, further comprising, within a scope, incrementing a counter as a result of executing a line of source code associated with an instrumentation and reporting a count from the counter to a reporting system.

14. One or more computer-readable storage media having stored thereon instructions that are executable by one or more processors of a computer system to cause the one or more processors to automatically instrument source code, including instructions that are executable to configure the computer system to perform at least the following:
   receive a source code document,
   identify a line of source code, from within the source code document, that includes an incomplete instrumentation, wherein the incomplete instrumentation comprises a modifiable portion configured to receive a unique identifier tag;
   create the unique identifier tag for the incomplete instrumentation;
   insert the unique identifier tag into the modifiable portion of the instrumentation, such that the source code document is modified;
   associate, with the instrumentation, at least one of (i) a specification of a severity level for the instrumentation, which is associated with an importance of the instrumentation, or (ii) a specification of a category for the instrumentation; and
   correlate the unique identifier tag to the line of source code,
   the instrumentation being structured to create a log entry in a log at runtime, wherein the log entry comprises the unique identifier tag correlated to one or more elements for the line of source code, the correlated one or more elements comprising at least one of (i) the severity level for the instrumentation, or (ii) the category for the instrumentation.

15. The one or more computer-readable storage media of claim 14, wherein the a log entry comprises a first log entry, the one or more computer-readable storage media further having stored thereon instructions that are executable by the one or more processors to configure the computer system to create a second log entry in the log comprising a metric for a scope of code.

* * * * *